Sept. 1, 1959 L. H. NIEMS 2,901,837
APPARATUS FOR COOLING PARTICLES
Filed March 1, 1955 3 Sheets-Sheet 1

Inventor
LEE H. NIEMS

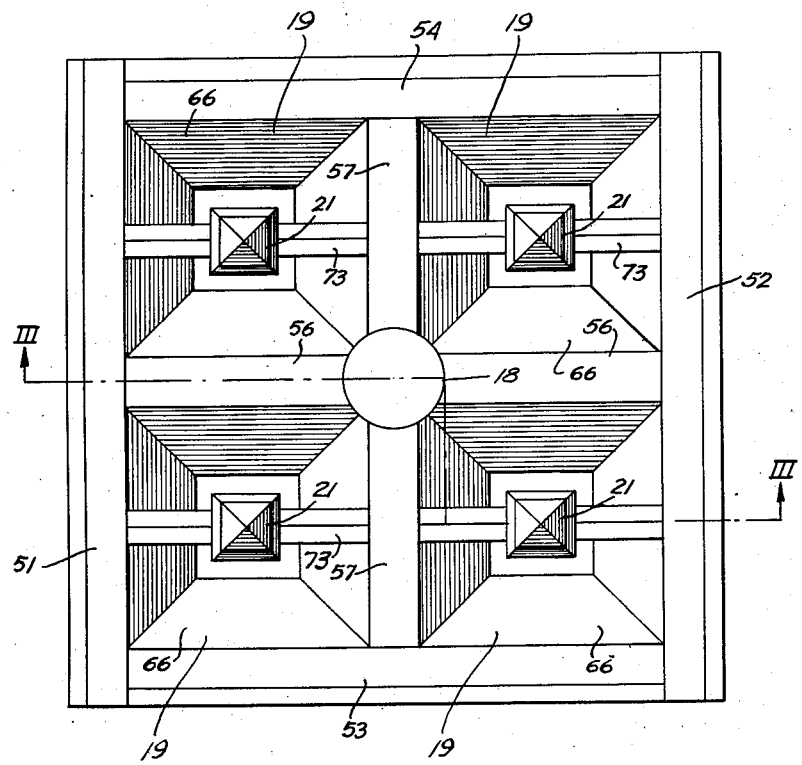

Sept. 1, 1959 L. H. NIEMS 2,901,837
APPARATUS FOR COOLING PARTICLES
Filed March 1, 1955 3 Sheets-Sheet 3
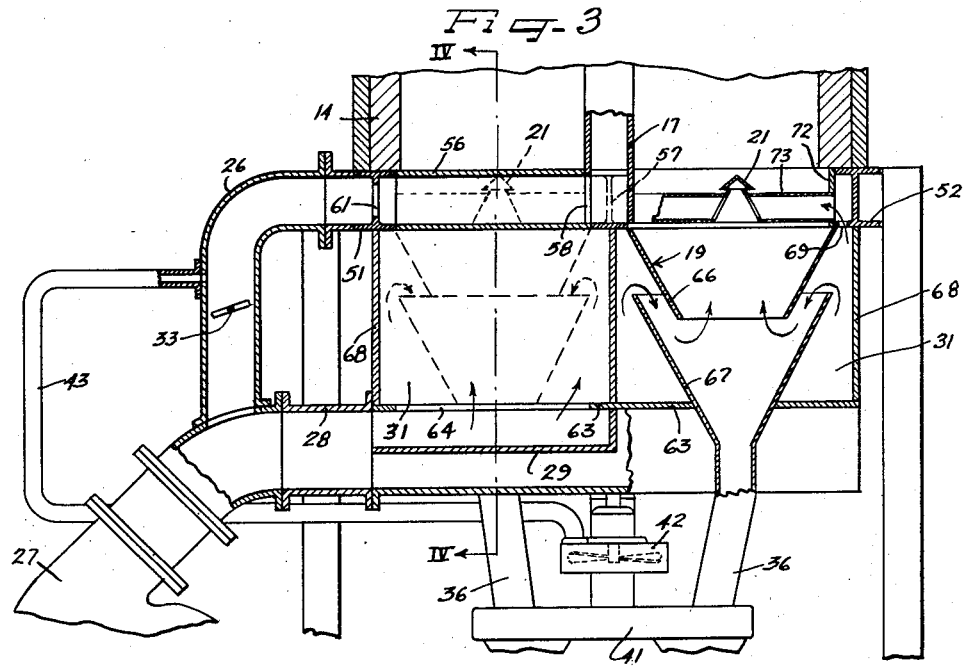
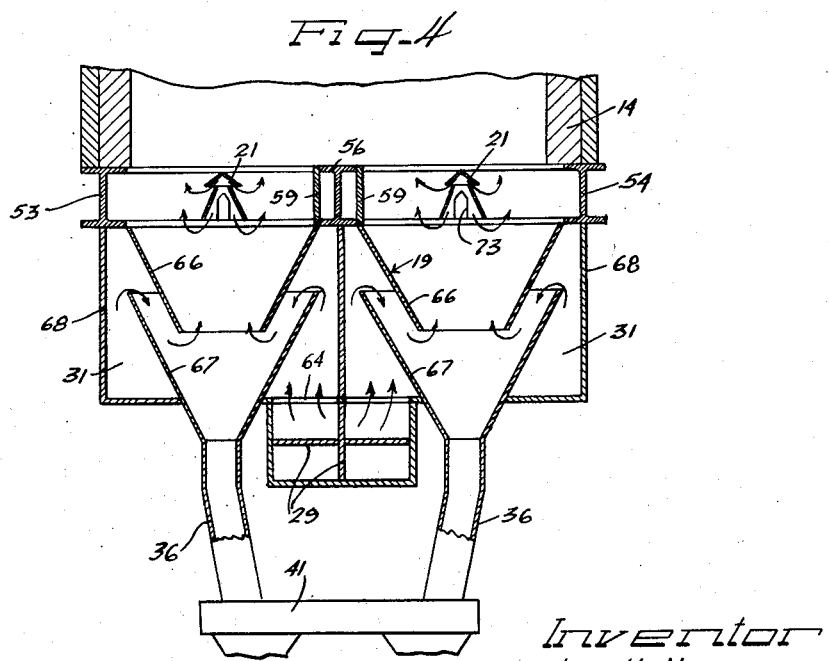
Inventor
LEE H. NIEMS excellent# United States Patent Office 2,901,837
Patented Sept. 1, 1959

2,901,837

APPARATUS FOR COOLING PARTICLES

Lee H. Niems, Homewood, Ill., assignor to Marblehead Lime Company, Chicago, Ill., a corporation of Delaware Application March 1, 1955, Serial No. 491,255

2 Claims. (Cl. 34—167)

The present invention is directed to an apparatus for cooling particles in a continuous manner.

The invention is particularly directed to an apparatus for cooling calcined lime particles after the calcining operation, but may also be used for cooling other types of products where dusting is a problem.

A typical calcining furnace for lime contains a rotary kiln which is heated directly by flames emanating from one or more burners. After this high temperature treatment, it is essential that the calcined particles be cooled thoroughly to a temperature at which they can be conveniently handled. For reasons of thermal efficiency, it is desirable to abstract the heat from these particles so that it can be reused for combustion and for drying the fuel. Hence, it is common practice to pass the calcined particles from the kiln into a cooling zone and to pass currents of air through the particles in the cooling zone. At least a part of the air thus heated is then reused for combustion and drying.

A cooling process of this type does not always proceed with the desired heat transfer efficiency. If the calcined lime particles are allowed to settle by gravity as they fall from the discharge end of the rotary kiln, they tend to classify according to their sizes in the cooling zone. The finer particles, including some dust-like particles, will tend to segregate at the center of the mass and the coarser particles tend to accumulate at the edges of the mass. Ultimately, the free settling of these particles results in the formation of a substantially conically shaped bed having an apex at the center where the finely divided particles are congregated. Since a large proportion of the fine particles are at the center, and since the center is of greater depth than the remainder of the bed, air flow through the mass meets substantially more resistance at the center than it does at the edges of the bed. Consequently, air being introduced into the base of the mass tends to follow the path of least resistance and much of the air will be channelled out toward the edges rather than going through the center of the mass. As the amount of air passing through the center decreases, the material contained therein becomes hotter and the air flowing in the center also becomes hotter. This higher temperature at the center further increases the mass flow resistance, since this resistance varies as the absolute temperature of the air. As a result of all these factors, in a short time a highly inefficient condition of heat transfer is built up in the cooler.

Another factor which contributes to this undesirable distribution pattern of air through the mass is what is known as the "wall effect." The coarser particles which tend to settle along the walls of the cooler are not as closely interpacked as the rest of the bed, so that the resistance to air flow along the walls is considerably decreased. Consequently, channelling effects are produced at the wall surface where the resistance to air flow is less than at other points in the mass. This channeling effect extends in toward the center of the mass to a distance several times the individual particle dimensions, due to off shoots of air from the air stream along the wall.

The cooling of lime particles has a further problem presented by the fact that much of the calcined product appears as very finely divided particles, and some may actually be powder. Consequently, it is not feasible to direct air currents at high velocities through the bed because of the severe entrainment of lime particles which would occur in the air streams.

While it is important, as noted above, to obtain a uniform flow of air through the mass in order to secure adequate cooling, it is equally important to obtain a uniform down-draw of material through the cooling zone. A simple hopper placed centrally of the cooler will not be effective to secure uniform down-draw because there will be a tendency for the finely divided material at the center of the discharge point to discharge more rapidly than the material along the sides of the cooler.

Accordingly, a principal object of the present invention is to provide an improved apparatus for cooling particles such as hot calcined lime particles.

Another object of the invention is to provide an apparatus for uniformly cooling a bed of lime particles even though the particles have become segregated or classified by free settling.

Another object of the invention is to provide an improved apparatus for cooling calcined lime particles in an efficient manner, and also providing for a continuous, uniform discharge of the lime particles through the cooling zone.

A further description of the present invention will be made in conjunction with the attached sheet of drawings, in which:

Figure 2 is a cross-sectional plan view of the cooler;

Figure 3 is a fragmentary cross-sectional view taken substantially along the line III—III of Figure 2; and Figure 4 is a fragmentary cross-sectional view taken substantially along the line IV—IV of Figure 3.

As shown on the drawing:

Figure 1:
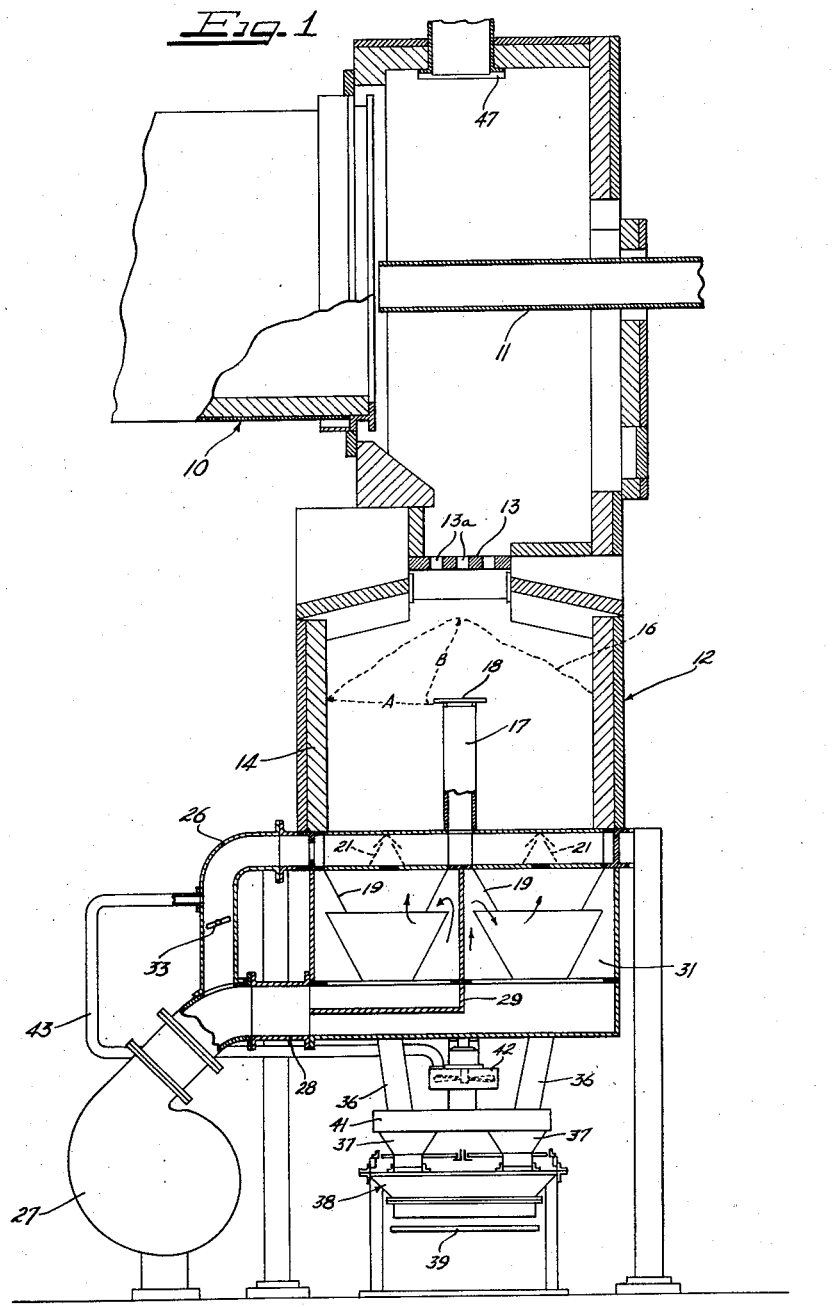
Figure 1 is a view in elevation and partly in cross-section of a cooler embodying the improvements of the present invention.

In Figure 1, reference numeral 10 indicates generally an inclined rotary kiln in which limestone or other particles have been calcined or otherwise heat treated. One or more burners 11 are located at the discharge end of the kiln 10 to supply the heat required for the calcination of the particles.

The kiln 10 is inclined toward the horizontal so that it discharges its particles by gravity into a cooling chamber generally indicated at numeral 12 in the drawing. In order to separate the desired lime particles from any large pieces of kiln coating or other foreign matter, the falling particles are directed through a grate 13 containing a plurality of apertures 13a.

The particles which pass through the grate 13 tend to settle by gravity into a cooling space 14, and in doing so form a conically shaped bed denoted by reference numeral 16, with the apex of the bed being located substantially at the center of the cooling zone 14.

Disposed centrally of the cooling chamber 14, and substantially in line with the apex of the conically shaped bed 16 is a central pipe 17 through which air under pressure in introduced into the bed. A baffle 18 is inserted into the end of the pipe 17 to aid in diffusing the air being introduced into the mass, and to keep particles from settling into the pipe.

In order to achieve the best cooling results, it is important that the height of the bed, and the point of introduction of the air from the pipe 17 be correlated in the following manner. The objective to be achieved is the introduction of air centrally of the mass at a point from which the resistance to air flow to the surface of the mass is substantially equal in all directions. In other words, the air leaving the discharge end of the pipe 17 should meet substantially equal resistance in all directions so that as an overall average, as much of the air will go toward the center, coned up portion of the mass as will tend to pass to the edges. Since the resistance of air flow toward the edges of the masses will be less per unit of distance than the resistance through the closely packed apex of the mass, the end of the pipe 17 should be positioned closer to the apex than it is to the edges. In other words, the distance B in the drawing, representing the path of the air flow effective to cool the apex of the mass, should be less than the distance A which represents the straight line path of air toward the outer edges of the coned up mass.

The particles in the bed 16 ultimately settle by gravity and are continuously discharged into a plurality of louvered hoppers 19 located in spaced relation about the central pipe 17. Providing a plurality of spaced discharge openings for the particles insures a more uniform down-draw of material and tends to insure a more uniform mixture of particles of different sizes at each of the discharge points. In order to further improve the uniformity of the down-draw through the hoppers 19, the cooler is provided with a plurality of air directors 21, the directors 21 being located centrally of each of the discharge hoppers 19. The directors 21 also act as baffles to prevent the direct down-draw or channeling of material through each hopper by causing a peripheral draw around the directors 21. The air introduced through the directors 21 enables a dispersal of the air across the entire cross section of the hopper, thereby further increasing the heat transfer efficiency.

Air is supplied to the central pipe 17 from a pipe 26 fed from a source of pressured air such as a blower 27. Air for the auxiliary air directors 21 is supplied from the blower 27 through an inlet pipe 28. A series of baffles 29 disposed in the path of the air being fed through the pipe 28 divides the air flow into a plurality of plenum chambers 31, one plenum chamber being associated with each of the discharge hoppers 19. The air flow occurs from the plenum chamber 31 through the louvers in the hoppers 19 as indicated by the arrows in Figure 1, as well as passing to the air directors 21.

The control of the amount of air being passed into the central pipe 17 as compared to the plenum chambers 31 is maintained by the adjustment of a damper 33 located in the pipe 26.

The structural details of the cooler assembly are best illustrated in Figures 3 and 4 of the drawings. As seen in these two figures, the cooling chamber 14 is supported upon a footing composed of six beams, said footing including laterally extending beams 51 and 52 are crossbeams 53 and 54. Centrally disposed beams 56 and 57 extend from the centers of the frame provided by the beams 51 through 54. The flanges and the webs of the central beams 56 and 57 are cut away to accommodate positioning the central pipe 17. The pipe 17 is continuous except for the provision of air slots 58 which permit the passage of air centrally of the pipe 17 from air passages formed about the beam 56 by walls 59 extending between the ends of the flanges of the beam 56. As indicated best in Figure 3, the beam 51 has one or more apertures 61 therein permitting the flow of air from the blower 27 through the pipe 26 between the walls 59, and ultimately into the central pipe 17 through the air slots 58.

As best indicated in Figures 3 and 4, the baffles 29 divide the air received through the pipe 28 into four separate compartments for feeding the plenum chambers 31. The lower walls of the plenum chambers 31 are formed by partitions 63 having apertures 64 therein which permit the flow of air upwardly into the plenum chambers 31.

The hoppers generally indicated at numeral 19 in the drawings consist of inwardly inclined louver plates 66 and 67 which are secured, respectively, to the beams or to the walls of the vertical partition members 68 which define the plenum chambers.

Air is supplied from the plenum chambers 31 to the air directors 21 in the following manner. Apertures 69 are provided in the flanges of the beams 51 and 52 to introduce air inwardly of the webs of the two beams. Vertical partition walls 72 close off the inner sides of the beams 51 and 52 and similar walls (not shown) close off both sides of the beam 57, with apertures arranged like apertures 69 being provided along the base flange of the beam 57 to introduce air between the web of said flange and its associated partition walls. Generally rectangular ducts 73 feed air from the passages associated with the beams 51, 52 and the central beam 57 to the centers of the hollow directors 21. Thus, air is free to flow from the plenum chambers 31 through the apertures 69, through the air ducts 73 and into the hollow interiors of the air directors 21.

The flow rate of air, and the proportioning of the air between the plenum chambers and the central pipe will depend to a large extent upon the size of the particles, the temperature reduction to be affected, and similar factors. It will also depend on the kiln efficiency which limits the amount of cooling air that can be used for combustion. Generally, the air flow rate for cooling ordinary calcined lime particles having a particle size of about 1½ inch to dust-like particles will vary from about to 150 to 220 cubic feet per minute per square foot of bed at standard conditions of temperature and pressure. Of this volume, about 10 to 20% is usually passed through the central pipe 17, and the remainder is directed into the plenum chambers 31.

The material leaving the hoppers 19 passes into a standpipe 36 which has a relatively long length compared to its cross-sectional dimensions. Each of the standpipes 36 discharges into a hopper 37, the standpipes 36 spaced from the hoppers 37 to provide a bleed off to a hood 41. The hoppers 37, in turn, discharge into a feeding mechanism generally indicated at numeral 38 and ultimately to a conveyor belt 39 which transports the particles for storage or further handling.

The hood 41 is provided above the hoppers 37 to prevent excessive blow off of lime dust. The air in the hood 41 is continually vented by means of a blower 42 which feeds the air through a line 43 back into the pipe 26 for recirculation into the cooling zone. Without the hood 41 escaping dust would cause a severe problem. In addition, any particles which may have been insufficiently cooled previously are cooled by the air passing down through the stand pipe 36, and the heat of these particles is recovered.

In the operation of the apparatus, the calcined particles are continuously discharged from the end of the kiln 10 and fall through the openings in the grate 13. As the particles settle, they tend to assume a coned up surface with the finer particles at the center and the coarser particles toward the edges of the mass. Air is continuously directed into the mass through the central pipe 17 and proceeds to flow through the mass substantially uniformly in all directions. A uniform cooling effect is thereby achieved in substantially all parts of the mass. Particles continue to fall by gravity and are then contacted with additional air streams provided by the air directors 21 and through the louvered hoppers 19. The discharge hoppers 19 then feed their contents to the standpipes 36, and ultimately into the feeding machine 38 where they are removed by the conveyor belt 39.

The air, after passage through particles may be vented through an exhaust duct 47 to a drying chamber where it may be employed in drying the fuel such as powdered coal prior to injecting the fuel into the burners, but a major portion of the air passes directly to the kiln where it is employed as pre-heated air for combustion.

It will be evident that various modifications can be made in the described method and apparatus without departing from the scope of the present invention.

I claim as my invention:

1. An apparatus for cooling particles comprising means defining a cooling zone, means for gravity feeding particles into said cooling zone, a first air inlet conduit disposed centrally of said zone, at least one secondary inlet in spaced relation about the center of said zone and below said first air inlet conduit, a louvered hopper dispersed beneath each of said secondary inlets, feed means for feeding air into said first air inlet conduit, said secondary inlets and about said louvered hoppers, a standpipe of substantial length receiving the discharged from said louvered hoppers, and a hood enclosing the discharge end of said standpipe and communicating with said feed means.

2. An apparatus for cooling particles comprising means defining a cooling zone, means for gravity feeding particles into said cooling zone, a first air inlet disposed centrally of said zone, a plurality of secondary air inlets disposed in spaced relation about said first air inlet, a louvered hopper disposed below each of said secondary air inlets, means for feeding air into said first air inlet, into said secondary air inlets, and about said louvered hoppers, standpipe means for withdrawing particles from said louvered hoppers, collecting means receiving the discharge of said hopper, a blower operating on the air in said collecting means, and means for recirculating the discharge from said blower back into said cooling zone.

References Cited in the file of this patent

UNITED STATES PATENTS

| | | |
|---|---|---|
| 260,567 | Hawkenson | July 4, 1882 |
| 334,987 | Shedd | Jan. 26, 1886 |
| 595,310 | Johnston | Dec. 14, 1897 |
| 1,034,861 | Bear | Aug. 6, 1912 |
| 1,496,094 | Moetteli | June 3, 1924 |